United States Patent
Ning et al.

(10) Patent No.: US 11,123,690 B2
(45) Date of Patent: Sep. 21, 2021

(54) METHOD AND DEVICE FOR COUPLING-SUPPRESSING WHITE FOG BY PURIFYING CO IN FLUE GAS

(71) Applicants: KUNMING UNIVERSITY OF SCIENCE AND TECHNOLOGY, Yunnan (CN); PINGXIANG HUAXING ENVIRONMENTAL PROTECTION ENGINEERING TECHNOLOGY CO., LTD., Jiangxi (CN)

(72) Inventors: Ping Ning, Kunming (CN); Qiulin Zhang, Kunming (CN); Guangcheng Wei, Kunming (CN); Dehua Zhang, Kunming (CN); Jing Wang, Kunming (CN); Xin Liu, Kunming (CN); Huimin Wang, Kunming (CN); Bo Li, Pingxiang (CN); Shaoming Li, Pingxiang (CN); Bin Li, Pingxiang (CN)

(73) Assignees: KUNMING UNIVERSITY OF SCIENCE AND TECHNOLOGY, Kunming (CN); PINGXIANG HUAXING ENVIRONMENTAL PROTECTION ENGINEERING TECHNOLOGY CO., LTD., Pinxiang (CN)

(*) Notice: Subject to any disclaimer, the term of this patent is extended or adjusted under 35 U.S.C. 154(b) by 0 days.

(21) Appl. No.: 16/701,559

(22) Filed: Dec. 3, 2019

(65) Prior Publication Data
US 2020/0171433 A1 Jun. 4, 2020

(30) Foreign Application Priority Data
Dec. 3, 2018 (CN) .......................... 201811462542.5

(51) Int. Cl.
*B01D 53/86* (2006.01)
*B01J 35/04* (2006.01)
*B01J 23/889* (2006.01)

(52) U.S. Cl.
CPC ....... *B01D 53/864* (2013.01); *B01D 53/8696* (2013.01); *B01J 23/8892* (2013.01); *B01J 35/04* (2013.01); *B01D 2255/2065* (2013.01); *B01D 2255/2073* (2013.01); *B01D 2255/20746* (2013.01); *B01D 2255/20761* (2013.01)

(58) Field of Classification Search
None
See application file for complete search history.

(56) References Cited

U.S. PATENT DOCUMENTS

| 4,248,612 A | * | 2/1981 | Wakabayashi | ......... | B01D 46/34 266/157 |
| 2011/0143921 A1 | * | 6/2011 | Hao | ....................... | B01J 23/894 502/74 |
| 2012/0023956 A1 | * | 2/2012 | Popovic | ............... | F25J 3/04569 60/772 |
| 2019/0232221 A1 | * | 8/2019 | Higashino | ............ | B01J 37/0201 |

FOREIGN PATENT DOCUMENTS

| CN | 107703875 A | | 2/2018 |
| CN | 108194939 A | | 6/2018 |
| CN | 108211748 A | | 6/2018 |
| CN | 108273370 A | | 7/2018 |
| JP | 2002248322 | * | 2/2001 |
| WO | 2018021512 | * | 2/2018 |

* cited by examiner

*Primary Examiner* — Sheng H Davis
(74) *Attorney, Agent, or Firm* — Alston & Bird LLP

(57) ABSTRACT

The present invention discloses a method and device for purifying CO from a flue gas and coupling-suppressing white fog, where the flue gas is introduced into a ceramic honeycomb carrier coated with a CO catalyst, sufficient $O_2$ in the flue gas is utilized to generate $CO_2$ from a low concentration of CO through catalytic oxidation, so as to achieve the purpose of purifying CO, and the flue gas is heated up by the heat released from the catalytic oxidation reaction to more than 110° C. and then discharged into the air, which meets the temperature requirement of coupling-suppressing white fog; the device includes a CO concentration sensor, a temperature sensor, a CO catalytic oxidation layer, an oxidation reaction tower, a desulfurized sintering flue gas, a packing layer I, a packing layer II, a chimney, and a solenoid valve II.

1 Claim, 1 Drawing Sheet

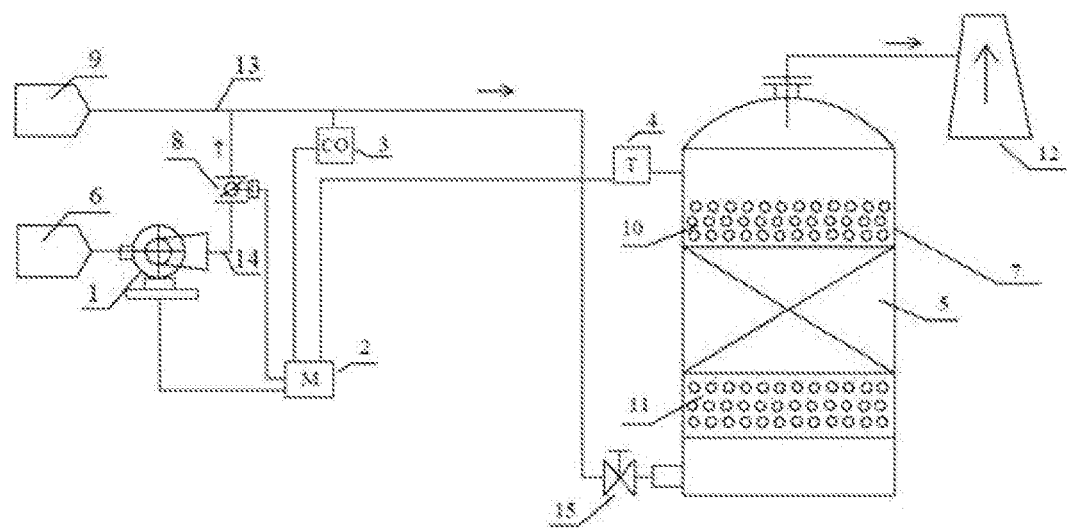

METHOD AND DEVICE FOR COUPLING-SUPPRESSING WHITE FOG BY PURIFYING CO IN FLUE GAS

TECHNICAL FIELD

The present invention belongs to the field of environmental protection and energy utilization, and involves a method and device for coupling-suppressing white fog by purifying CO in flue gas. In the iron and steel industry, the autothermal catalytic oxidation of CO in the sintering flue gas raises the temperature of the flue gas, and a small amount of a blast furnace flue gas is utilized to supplement the CO in the desulfurized sintering flue gas, so that the heat is fully utilized, the white fog is suppressed, and CO in the flue gas is efficiently purified, achieving the purposes of energy conservation and emission reduction.

BACKGROUND

There is a large amount of $SO_2$-containing sintering flue gas is generated during operation in the iron and steel industry. According to the Annual Statistic Report On Environment released by the Ministry of Ecological Environment of the People's Republic of China in 2015, a total of 1.368 million tons of sulfur dioxide were produced in the iron and steel industry, accounting for 78.8% of the emission load of the ferrous metal smelting and rolling processing industry. At present, the wet desulfurization method is still the maturest $SO_2$ control technology as well as the main desulfurization method. However, the formation of the white fog at the mouth of a chimney was promoted by the high moisture content and low temperature of the sintering flue gas after wet desulfurization. It is attributed to the change of content of air-saturated water with the variation of temperature and pressure. When the moisture content in the flue gas is greater than that in the atmosphere, a white smoke phenomenon occurs. The white fog phenomenon has a poor visual effect and will bring a serious negative impact on the corporate image. The white fog of flue gas is also one of the important reasons of reduction in the diffusion of flue gas and formation of haze. Moreover, sulfite droplets are also generated from the reaction between condensed liquid water and the $SO_2$ remained in the purified flue gas, and then formed sulfuric acid droplets with stronger corrosivity with the action of oxygen. The moisture content before wet desulfurization is generally 2%-5%, and the humidity is increased to about 10% after wet desulfurization. To completely suppress the white fog, the temperature of the sintering flue gas after desulfurization must be increased to 100-130° C. Furthermore, it is considered that a temperature drop of about 5-15° C. after the flue gas is discharged from the chimney and in contact with the atmosphere. The flue gas reheating technology is a conventional method for coupling-suppressing the white fog at the present stage, but the cost of flue gas reheating is relatively high and cannot be afforded by an ordinary enterprise. Furthermore, the sintering flue gas of the iron and steel industry contains about 0.6%-1.2% of CO, and CO is a highly toxic gas, which easily causes environmental pollution.

In China the occurrence of a wet flue gas phenomenon is very common, and the research advances in the white fog suppression technology is also very slow. The current white fog suppression technology mainly includes two manners, heating and condensing, with a large investment and high energy consumption, and requires an additional heat exchanger. The patent CN 108211748 A has proposed to reduce the water content in the flue gas through a mist eliminator and a polymer water-absorbing particles, and to dispose a chimney heat exchanger at the top of a chimney to increase the exhaust gas temperature; the patent CN 108194939 A has reduced the moisture content of the flue gas by adding a condensing heat exchanger after a desulfurization tower to subject the flue gas after desulfurization to condensation heat exchange; The patent CN 108273370 A has invented a device and method for wet flue gas desulfurization, which uses a dehumidification heater in combination with white fog removal of the flue gas, but requires continuous addition of a dehumidizer; and the patent CN 107703875 A uses a heat exchange principle to heat the flue gas in a pipeline and evaporate part of the water vapor by introducing the waste heat of a sintering machine.

SUMMARY

The present invention adopts a method of purifying CO and coupling-suppressing white fog, and utilizes a low concentration of CO in a flue gas and a high concentration of $O_2$ under the action of a catalyst to fully catalyze the self-heating of the oxidation, heat the flue gas, and suppress the white fog phenomenon. Meanwhile, in order to prevent the CO in the sintering flue gas of steel or iron from failing to provide the required heat, a small amount of a blast furnace exhaust gas is introduced to supplement the CO in the sintering flue gas.

The present invention provides a method for purifying CO from a flue gas and coupling-suppressing white fog. The low concentration of CO was transformed to $CO_2$ with the help of sufficient $O_2$ in the flue gas, when the flue gas is introduced into a ceramic honeycomb carrier coated with a CO catalyst, so as to achieve the purpose of purifying CO. The flue gas is heated up by the heat released from the catalytic oxidation reaction to more than 110° C. and then discharged into the air, which meets the temperature requirement of coupling-suppressing white fog, so that heat is fully utilized, the white fog is eliminated from the flue gas, and synchronously CO in the flue gas is purified, achieving the purposes of energy conservation and emission reduction.

The volume percent concentration of CO in the flue gas is ≥1%, and the flue gas is a desulfurized sintering flue gas of steel or iron, or a mixed flue gas of the desulfurized sintering flue gas of steel or iron and a blast furnace flue gas.

The active composition and mass percentage content of the CO catalyst are 20-25% of CuO, 25-35% of $MnO_2$, 20-25% of $CeO_2$ and 20-25% of $Co_3O_4$.

The present invention also provides a device for purifying CO from a flue gas and coupling-suppressing white fog, which includes a CO concentration sensor 3, a temperature sensor 4, a CO catalytic oxidation layer 5, an oxidation reaction tower 7, a desulfurized sintering flue gas 9, a packing layer I 10, a packing layer II 11, a chimney 12, and a solenoid valve II 15, where the desulfurized sintering flue gas 9 is connected to a flue gas inlet at the bottom of the oxidation reaction tower 7 through a gas transmission pipeline 13, the CO concentration sensor 3 is arranged on the gas transmission pipeline 13, the flue gas inlet at the bottom of the oxidation reaction tower 7 is provided with the solenoid valve II 15, the oxidation reaction tower 7 is provided with the packing layer I 10, the CO catalytic oxidation layer 5, and the packing layer II 11 from top to bottom sequentially therein, a flue gas outlet at the top of the oxidation reaction tower 7 is provided with the temperature sensor 4, and the flue gas outlet at the top of the oxidation reaction tower 7 is connected to the chimney 12.

The device also includes an aspirator pump 1, a blast furnace flue gas 6, a solenoid valve I 8, and also a blast furnace flue gas pipeline 14 connected on the gas transmission pipeline 13, where the blast furnace flue gas pipeline 14 is connected to the blast furnace flue gas 6, and the blast furnace flue gas pipeline is provided with the aspirator pump 1 and the solenoid valve I 8 thereon.

The device also includes a controller 2, where the aspirator pump 1, the CO concentration sensor 3, the temperature sensor 4 and the solenoid valve I 8 are respectively connected to the controller 2, and the controller 2 is a conventional PLC controller as long as it is capable of realizing the receipt of data and feedback.

The packing layer I 10 and the packing layer II 11 are filled with a spherical filler with a diameter of 3 cm, and the filler is a turbulence sphere or quartz sand particles.

The method for purifying CO from a flue gas and coupling-suppressing a white fog is conducted utilizing the device of the present invention, and includes the following specific steps:

The desulfurized sintering flue gas of steel or iron in the desulfurized sintering flue gas 9 is introduced into the bottom of the oxidation reaction tower 7, and the CO concentration sensor 3 feeds the detection data back to the controller 1 when the CO concentration sensor 3 detects that the volume percentage concentration of the CO in the desulfurized sintering flue gas of steel or iron is greater than 1%, then the solenoid valve II 15 is opened such that the desulfurized sintering flue gas of steel or iron normally enters the oxidation reaction tower 7, passes through the packing layer II 11, and passes through the packing layer I 10 to reach the outlet on the top of the oxidation reaction tower 7 after the CO is catalytically oxidized at the CO catalytic oxidation layer 5 in the oxidation reaction tower 7, and when the temperature sensor 4 detects that the temperature of the flue gas is greater than 110° C., the flue gas is introduced into the chimney 12 for discharging, and no white fog phenomenon is observed at the outlet of the chimney 12;

The CO concentration sensor 3 feeds the data back to the controller 2 when the CO concentration sensor 3 detects that the volume percentage concentration of the CO in the desulfurized sintering flue gas of steel or iron is less than 1%, then the controller 2 activates the aspirator pump 1 and opens the solenoid valve I 8 to pump the blast furnace flue gas in the blast furnace flue gas 6 into the blast furnace flue gas pipeline 14 and then into the gas transmission pipeline 13, and the CO concentration sensor 3 feeds the detection data back to the controller 1 when the CO concentration sensor 3 detects that the volume percentage concentration of the CO in the mixed flue gas is greater than 1%, then the solenoid valve II 15 is opened such that the mixed flue gas enters the oxidation reaction tower 7, passes through the packing layer II 11, and passes through the packing layer I 10 to reach the outlet on the top of the oxidation reaction tower 7 after the CO is catalytically oxidized at the CO catalytic oxidation layer 5 in the oxidation reaction tower 7, and when the temperature sensor 4 detects that the temperature of the flue gas exceeds 110° C., the flue gas is introduced into the chimney 12 for discharging, and no white fog phenomenon is observed at the outlet of the chimney 12.

The principle of the present invention:

the concentrations of CO in the flue gas required for temperature rise of different flue gases are calculated by the method of calculating the heat of the sintering flue gas (formulas (1), (2) and (3)) as follows:

$$Q = C_p * V * \rho * \Delta T \quad (1)$$

Where, Q: represents the heat of the flue gas in KJ; Cp: represents the specific heat capacity of the sintering flue gas at a constant pressure in KJ/(Kg*K); V: represents the volume of the flue gas in m³; ρ: represents the density of the flue gas in Kg/m³; and ΔT: represents the temperature of the flue gas in K;

$$Q = \frac{V}{22.4(L/mol)} * X\% * \Delta H \quad (2)$$

Where, Q: represents the heat of the flue gas in KJ; V: represents the volume of the flue gas in m³; X %: represents the concentration of CO in the flue gas; and ΔH: represents the combustion heat of CO in KJ/mol;

$$2CO + O_2 = 2CO_2 + H_2O \quad \Delta H = 566 \text{ KJ/mol} \quad (3)$$

The heat of the flue gas calculated by the formula (1) is equal to that of the formula (2). A relationship between X and ΔT is obtained by forming an equation from the right sides of the two formulas. The formula (3) and the known parameters are put into the equation, and it is found that ΔT=58.5° C. when X=0.6; ΔT=68.3° C. when X=0.7; ΔT=78° C. when X=0.8; and ΔT=110° C. when X=1.13.

The heat generated by the catalytic oxidation between the sufficient O₂ and the low concentration of CO in the flue gas heats up the flue gas to raise the temperature of the sintering flue gas, which avoids the generation of white fog and simultaneously removes the CO from the flue gas. At present, the temperature of the sintering flue gas of steel or iron after wet desulfurization is 60-70° C. In order to achieve white fog suppression on the desulfurized sintering flue gas, the temperature of the outlet flue gas needs to be controlled above 110° C. Considering the heat loss condition of an actual process (about 30%), it is reversely deduced that the temperature of the flue gas after heating is greater than 158° C., then a temperature to be raised of about 100° C. is obtained by subtracting the original temperature from the temperature after heating. As calculated according to the formulas, when the concentration of CO in the flue gas is 1%, the heat released by the catalytic oxidation of carbon monoxide can raise the temperature by about 100° C., then the temperature of the flue gas can be controlled above 110° C. in the case of subtracting the heat loss (30%).

The advantages and beneficial effects of the present invention:

(1) the present invention has a high heat utilization rate, where the heat generated by the autothermal catalytic oxidation of CO are completely used for heating the desulfurized sintering flue gas, without the need for other heating devices;

(2) in the present invention, the CO in the flue gas can be purified while coupling-suppressing the white fog, realizing simultaneous processing;

(3) the energy conservation and emission reduction effect is remarkable, where a small amount of blast furnace exhaust gas is additionally supplemented to increase the CO in the flue gas, and by utilizing the blast furnace exhaust gas, no additional CO supplementing device is needed;

(4) the present invention has a simple operation, simple equipment, a simple process, a low investment, a low operating cost, and a low energy consumption.

BRIEF DESCRIPTION OF THE DRAWINGS

FIG. 1 is a device for purifying CO in the flue gas and coupling-suppressing white fog according to Example 1 of the present invention; in which, 1 represents an aspirator pump; 2 represents a controller; 3 represents a CO concentration sensor; 4 represents a temperature sensor; 5 represents a CO catalytic oxidation layer; 6 represents a blast furnace flue gas; 7 represents an oxidation reaction tower; 8 represents a solenoid valve I; 9 represents a desulfurized sintering flue gas; 10 represents a packing layer I; 11 represents a packing layer II; 12 represents a chimney; 13 represents a gas transmission pipeline; 14 represents a blast furnace flue gas pipeline; and 15 represents a solenoid valve II.

DESCRIPTION OF THE EMBODIMENTS

The present invention will be described in detail below with reference to specific embodiments.

Example 1

A device for purifying CO from a flue gas and coupling-suppressing white fog, as shown in FIG. 1, included an aspirator pump 1, a controller 2, a CO concentration sensor 3, a temperature sensor 4, a CO catalytic oxidation layer 5, a blast furnace flue gas 6, an oxidation reaction tower 7, a solenoid valve I 8, a desulfurized sintering flue gas 9, a packing layer I 10, a packing layer II 11, a chimney 12, and a solenoid valve II 15. The desulfurized sintering flue gas 9 was connected to a flue gas inlet at the bottom of the oxidation reaction tower 7 through a gas transmission pipeline 13. The CO concentration sensor 3 was arranged on the gas transmission pipeline 13. The flue gas inlet at the bottom of the oxidation reaction tower 7 was provided with the solenoid valve II 15. The oxidation reaction tower 7 was provided with the packing layer I 10, the CO catalytic oxidation layer 5, and the packing layer II 11 from top to bottom sequentially therein. A flue gas outlet at the top of the oxidation reaction tower 7 was provided with the temperature sensor 4. The flue gas outlet at the top of the oxidation reaction tower 7 was connected to the chimney 12. Also a blast furnace flue gas pipeline 14 was connected on the gas pipeline 13. The blast furnace flue gas pipeline 14 was connected to the blast furnace flue gas 6, and the blast furnace flue gas pipeline 14 was provided with the aspirator pump 1 and the solenoid valve I 8 thereon. The aspirator pump 1, the CO concentration sensor 3, the temperature sensor 4, and the solenoid valve I 8 were respectively connected to the controller 2. The controller 2 was a conventional PLC controller as long as it is capable of realizing the receipt of data and feedback. The CO concentration sensor 3 is used for detecting the concentration of CO in the flue gas pipeline 13, and the CO concentration sensor with the model of MOT500-CO as manufactured by Shenzhen Korno Electronic Technology Co., Ltd. is adopted.

Example 2

A method for purifying CO from a flue gas and coupling-suppressing white fog included the following specific steps:

(1) the flow rate of the wet desulfurization flue gas was 1000 Nm$^3$/h, and the composition of the flue gas was 1.2% of CO, 21% of $O_2$, 13% of $H_2O$, 63.4% of $N_2$, and 1% of $SO_2$+NO, the initial temperature of the flue gas was 65° C., a CO catalyst was coated on a ceramic honeycomb carrier, and the carrier was charged into the CO catalytic oxidation layer 5 of the device of Example 1, where the active composition and the mass percentage content of the CO catalyst were 25% of CuO, 25% of $MnO_2$, 25% of $CeO_2$, and 25% of $Co_3O_4$, and the packing layer I 10 and the packing layer II 11 were filled with a spherical filler with a diameter of 3 cm, and the filler was a turbulence sphere;

(2) the desulfurized sintering flue gas of steel or iron in the desulfurized sintering flue gas 9 was introduced into the bottom of the oxidation reaction tower 7, and the CO concentration sensor 3 fed the detection data back to the controller 1 when the CO concentration sensor 3 detected that the volume percentage concentration of the CO in the desulfurized sintering flue gas of steel or iron was 1.2%, then the solenoid valve II 15 was opened such that the desulfurized sintering flue gas of steel or iron normally entered the oxidation reaction tower 7, passed through the packing layer II 11, and passed through the packing layer I 10 to reach the outlet on the top of the oxidation reaction tower 7 after the CO was catalytically oxidized at the CO catalytic oxidation layer 5 in the oxidation reaction tower 7, and when the temperature sensor 4 detected that the temperature of the flue gas was 127° C., the flue gas was introduced into the chimney 12 for discharging, and no white fog phenomenon was observed at the outlet of the chimney 12. Upon detection, the residual amount of CO in the flue gas at the outlet of the chimney 12 was less than 200 ppm, reaching the emission standard.

When an emergency circumstance occurred, for example when the volume percentage concentration of CO as detected was ≥1%, and when the temperature detected by the temperature sensor 4 did not reach 110° C., indicating that there was a malfunction inside the device, then at this point the solenoid valve II 15 was subjected to emergency shutdown to check the inside of the device and the activity of the CO catalyst.

Example 3

A method for purifying CO from a flue gas and coupling-suppressing white fog included the following specific steps:

(1) the flow rate of the wet desulfurization flue gas was 1000 Nm$^3$/h, and the composition of the flue gas was 0.6% of CO, 21% of $O_2$, 13% of $H_2O$, 63.4% of $N_2$, and 1% of $SO_2$+NO, the initial temperature of the flue gas was 60° C., the flow rate of the blast furnace flue gas was 35 Nm$^3$/h, the composition of the blast furnace flue gas was 20% of CO and 80% of $N_2$+$CO_2$, and the initial temperature of the blast furnace flue gas was 60° C., a CO catalyst was coated on a ceramic honeycomb carrier, and the carrier was charged into the CO catalytic oxidation layer 5 of the device of Example 1, where the active composition and the mass percentage content of the CO catalyst were 20% of CuO, 35% of $MnO_2$, 25% of $CeO_2$, and 20% of $Co_3O_4$, and the packing layer I 10 and the packing layer II 11 were filled with a spherical filler with a diameter of 4 cm, and the filler was quartz sand particles;

(2) the desulfurized sintering flue gas of steel or iron in the desulfurized sintering flue gas 9 was introduced into the bottom of the oxidation reaction tower 7, and the CO concentration sensor 3 fed the data back to the controller 2 when the CO concentration sensor 3 detected that the volume percentage concentration of the CO in the desulfurized sintering flue gas of steel or iron was less than 1%, then the controller 2 activated the aspirator pump 1 and opened the solenoid valve I 8 to pump the blast furnace flue gas in the blast furnace flue gas 6 into the blast furnace flue gas pipeline 14 and then into the gas transmission pipeline 13, and the CO concentration sensor 3 fed the detection data back to the controller 1 when the CO concentration sensor 3 detected that the volume percentage concentration of the CO in the mixed flue gas was 1.25%, then the solenoid valve II 15 was opened such that the mixed flue gas entered the oxidation reaction tower 7, passed through the packing layer II 11, and passed through the packing layer I 10 to reach the outlet on the top of the oxidation reaction tower 7 after the CO was catalytically oxidized at the CO catalytic oxidation layer 5 in the oxidation reaction tower 7, and when the temperature sensor 4 detected that the temperature of the flue gas was 127° C., the flue gas was introduced into the chimney 12 for discharging, and no white fog phenomenon was observed at the outlet of the chimney 12. Upon detection, the residual amount of CO in the flue gas at the outlet of the chimney 12 was less than 200 ppm, reaching the emission standard.

When an emergency circumstance occurred, for example when the volume percentage concentration of CO as detected was ≥1%, and when the temperature detected by the temperature sensor 4 did not reach 110° C., indicating that there was a malfunction inside the device, then at this point the solenoid valve II 15 was subjected to emergency shut-down to check the inside of the device and the activity of the CO catalyst.

Example 4

A method for purifying CO from a flue gas and coupling-suppressing white fog included the following specific steps:

(1) the flow rate of the wet desulfurization flue gas was 1000 Nm$^3$/h, and the composition of the flue gas was 1% of CO, 21% of $O_2$, 13% of $H_2O$, 63.4% of $N_2$, and 1% of $SO_2$+NO, the initial temperature of the flue gas was 60° C., the CO catalyst was coated on a ceramic honeycomb carrier, and the carrier was charged into the CO catalytic oxidation layer 5 of the device of Example 1, where the active composition and the mass percentage content of the CO catalyst were 23% of CuO, 32% of $MnO_2$, 22% of $CeO_2$, and 23% of $Co_3O_4$, and the packing layer I 10 and the packing layer II 11 were filled with a spherical filler with a diameter of 5 cm, and the filler was quartz sand particles;

(2) the desulfurized sintering flue gas of steel or iron in the desulfurized sintering flue gas 9 was introduced into the bottom of the oxidation reaction tower 7, and the CO concentration sensor 3 fed the detection data back to the controller 1 when the CO concentration sensor 3 detected that the volume percentage concentration of the CO in the desulfurized sintering flue gas of steel or iron was 1%, then the solenoid valve II 15 was opened such that the desulfurized sintering flue gas of steel or iron normally entered the oxidation reaction tower 7, passed through the packing layer II 11, and passed through the packing layer I 10 to reach the outlet on the top of the oxidation reaction tower 7 after the CO was catalytically oxidized at the CO catalytic oxidation layer 5 in the oxidation reaction tower 7, and when the temperature sensor 4 detected that the temperature of the flue gas was 110° C., the flue gas was introduced into the chimney 12 for discharging, and no white fog phenomenon was observed at the outlet of the chimney 12. Upon detection, the residual amount of CO in the flue gas at the outlet of the chimney 12 was less than 200 ppm, reaching the emission standard.

When an emergency circumstance occurred, for example when the volume percentage concentration of CO as detected was ≥1%, and when the temperature detected by the temperature sensor 4 did not reach 110° C., indicating that there was a malfunction inside the device, then at this point the solenoid valve II 15 was subjected to emergency shut-down to check the inside of the device and the activity of the CO catalyst.

Example 5

A method for purifying CO from a flue gas and coupling-suppressing white fog included the following specific steps:

(1) the flow rate of the wet desulfurization flue gas was 14,000 Nm$^3$/h, and the composition of the flue gas was 0.8% of CO, 21% of $O_2$, 13% of $H_2O$, 63.4% of $N_2$, and 1% of $SO_2$+NO, the initial temperature of the flue gas was 65° C., the flow rate of the blast furnace flue gas was 340 Nm$^3$/h, the composition of the blast furnace flue gas was 20% of CO and 80% of $N_2$+$CO_2$, and the initial temperature of the flue gas was 65° C., a CO catalyst was coated on a ceramic honeycomb carrier, and the carrier was charged into the CO catalytic oxidation layer 5 of the device of Example 1, where the active composition and the mass percentage content of the CO catalyst were 20% of CuO, 30% of $MnO_2$, 25% of $CeO_2$, and 25% of $Co_3O_4$, and the packing layer I 10 and the packing layer II 11 were filled with a spherical filler with a diameter of 3 cm, and the filler was a turbulence sphere;

(2) the desulfurized sintering flue gas of steel or iron in the desulfurized sintering flue gas 9 was introduced into the bottom of the oxidation reaction tower 7, and the CO concentration sensor 3 fed the data back to the controller 2 when the CO concentration sensor 3 detected that the volume percentage concentration of the CO in the desulfurized sintering flue gas of steel or iron was less than 1%, then the controller 2 activated the aspirator pump 1 and opened the solenoid valve I 8 to pump the blast furnace flue gas in the blast furnace flue gas 6 into the blast furnace flue gas pipeline 14 and then into the gas transmission pipeline 13, and the CO concentration sensor 3 fed the detection data back to the controller 1 when the CO concentration sensor 3 detected that the volume percentage concentration of the CO in the mixed flue gas was 1.256%, then the solenoid valve II 15 was opened such that the mixed flue gas entered the oxidation reaction tower 7, passed through the packing layer II 11, and passed through the packing layer I 10 to reach the outlet on the top of the oxidation reaction tower 7 after the CO was catalytically oxidized at the CO catalytic oxidation layer 5 in the oxidation reaction tower 7, and when the temperature sensor 4 detected that the temperature of the flue gas was 122° C., the flue gas was introduced into the chimney 12 for discharging, and no white fog phenomenon was observed at the outlet of the chimney 12. Upon detection, the residual amount of CO in the flue gas at the outlet of the chimney 12 was less than 200 ppm, reaching the emission standard. When an emergency circumstance occurred, for example when the volume percentage concentration of CO as detected was ≥1%, and when the temperature detected by the temperature sensor 4 did not reach 110° C., indicating that there was a malfunction inside the device, then at this point the solenoid valve II 15 was subjected to emergency shut-down to check the inside of the device and the activity of the CO catalyst.

What is claimed is:

1. A method for purifying CO from a flue gas and coupling-suppressing white fog, wherein the flue gas is introduced into a ceramic honeycomb carrier coated with a CO catalyst, $CO_2$ is generated from CO through catalytic oxidation, and the flue gas is heated by the heat released from the catalytic oxidation reaction to more than 110° C. and then discharged into the air, when a volume percent concentration of CO in the flue gas is less than 1%, the flue gas is a mixed flue gas of a desulfurized sintering flue gas of steel or iron and a blast furnace flue gas, and when the volume percent concentration of CO in the flue gas is greater than or equal to 1%, the flue gas is the desulfurized sintering flue gas of steel or iron, wherein active composition and mass percentage content of the CO catalyst are 20-25% of CuO, 25-35% of $MnO_2$, 20-25% of $CeO_2$ and 20-25% of $Co_3O_4$.

* * * * *